United States Patent
Park

(10) Patent No.: US 8,005,056 B2
(45) Date of Patent: Aug. 23, 2011

(54) INTERNET PROTOCOL ADDRESS ALLOCATION METHOD USING BASE STATION AND MOBILE TERMINAL, AND SYSTEM THEREFOR

(75) Inventor: Seong Jin Park, Seoul (KR)

(73) Assignee: LG Electronics Inc., Seoul (KR)

( * ) Notice: Subject to any disclaimer, the term of this patent is extended or adjusted under 35 U.S.C. 154(b) by 681 days.

(21) Appl. No.: 11/598,677

(22) Filed: Nov. 14, 2006

(65) Prior Publication Data

US 2007/0110058 A1  May 17, 2007

(30) Foreign Application Priority Data

Nov. 15, 2005  (KR) .................. 10-2005-0109060

(51) Int. Cl.
*H04W 4/00* (2009.01)
(52) U.S. Cl. ........ 370/338; 370/352; 370/377; 370/384; 370/385; 370/324; 370/466; 370/349; 370/401; 370/389; 370/465; 455/435.2; 455/432.1; 455/428; 455/452.1
(58) Field of Classification Search ............... 455/435.2, 455/432.1, 428, 452.1
See application file for complete search history.

(56) References Cited

U.S. PATENT DOCUMENTS

| | | | |
|---|---|---|---|
| 6,542,491 B1 * | 4/2003 | Tari et al. ....................... | 370/338 |
| 6,792,474 B1 * | 9/2004 | Hopprich et al. ............. | 709/245 |
| 7,194,004 B1 * | 3/2007 | Thomsen ....................... | 370/401 |
| 7,512,381 B1 * | 3/2009 | Sylvain ......................... | 455/66.1 |
| 2001/0044305 A1 * | 11/2001 | Reddy et al. .................. | 455/436 |
| 2002/0036658 A1 * | 3/2002 | Carolan et al. ................. | 345/764 |
| 2002/0057657 A1 * | 5/2002 | La Porta et al. ............... | 370/331 |
| 2002/0155827 A1 * | 10/2002 | Agrawal et al. ............... | 455/414 |
| 2003/0126262 A1 * | 7/2003 | Yoshida et al. ............... | 709/226 |
| 2003/0195001 A1 * | 10/2003 | Tari et al. ..................... | 455/435.2 |
| 2003/0195002 A1 * | 10/2003 | Singhal et al. ................. | 455/436 |
| 2006/0031393 A1 * | 2/2006 | Cooney et al. ................. | 709/217 |

FOREIGN PATENT DOCUMENTS

| | | | |
|---|---|---|---|
| JP | 2001-186573 | A | 7/2001 |
| KR | 2002-0085033 | A | 11/2002 |
| KR | 10-2004-0044713 | A | 5/2004 |
| KR | 10-2005-0027454 | A | 3/2005 |
| KR | 10-2005-0066307 | A | 6/2005 |

* cited by examiner

*Primary Examiner* — Kwasi Karikari
(74) *Attorney, Agent, or Firm* — Birch, Stewart, Kolasch & Birch, LLP

(57) ABSTRACT

An Internet Protocol (IP) address allocation method, system and mobile terminal, mobile terminal including a radio frequency (RF) unit for transmitting a signal requesting allocation of an IP address for access to Internet to a base station and receiving information about an identifier of the base station and information about an IP address range allocated to the base station from the base station, and a controller for controlling the RF unit to transmit the IP address allocation request signal to the base station, selecting an IP address using the identifier information and IP address range information received through the RF unit, and controlling the RF unit to send a signal requesting use of the selected IP address to an IP address server through the base station. An IP address is acquired using a base station so that an IP address allocation time can be shortened.

6 Claims, 7 Drawing Sheets

INTERNET PROTOCOL ADDRESS ALLOCATION METHOD USING BASE STATION AND MOBILE TERMINAL, AND SYSTEM THEREFOR

This application claims the benefit of Korean Patent Application No. 10-2005-0109060, filed on Nov. 15, 2005, which is hereby incorporated by reference as if fully set forth herein.

BACKGROUND OF THE INVENTION

1. Field of the Invention

The present invention relates to a mobile terminal, and more particularly, to a method for allocating an Internet Protocol (IP) address to an Internet-accessible mobile terminal.

2. Discussion of the Related Art

In general, a Dynamic Host Configuration Protocol (DHCP) is widely used for allocating an IP address for a mobile terminal.

The DHCP allows a DHCP server to allocate an IP address to a subscriber's mobile terminal dynamically, not fixedly.

FIG. 1 is a flowchart illustrating a conventional IP address allocation process between a mobile terminal and a DHCP server.

Referring to FIG. 1, a mobile terminal 10 broadcasts a DHCP DISCOVER message to a plurality of DHCP servers through a base station such that it is allocated an IP address for access to the mobile Internet (S1).

If any one 20 of the DHCP servers receives the DHCP DISCOVER message from the mobile terminal 10 through the base station, it transmits a DHCP OFFER message (including an IP address and parameters), which is a reply message to the DHCP DISCOVER message, to the mobile terminal 10 (S2).

The mobile terminal 10 receives the DHCP OFFER message transmitted from the DHCP server 20 and transmits a DHCP REQUEST message requesting allocation of the IP address included in the received DHCP OFFER message to the DHCP server 20 through the base station (S3).

The DHCP server 20 receives the DHCP REQUEST message, allocates the IP address to the mobile terminal 10, and transmits, to the mobile terminal 10, a DHCP ACK message notifying that the IP address allocation has been successfully performed (S4).

In the IP address allocation process, as mentioned above, the mobile terminal 10 gets the IP address from the DHCP server 20 through all procedures defined in the DHCP standard.

However, in order to get an IP address, a mobile terminal has to, for every allocation, search a plurality of DHCP servers to find one for providing the IP address.

Further, the searched DHCP server must search for an IP address whenever the mobile terminal requests an IP address allocation, resulting in a lengthy period of time being required for the IP address allocation, thus making it impossible to rapidly provide a mobile Internet service to the user.

SUMMARY OF THE INVENTION

Accordingly, the present invention is directed to an Internet Protocol address allocation method using a base station and a mobile terminal, and a system therefor, that substantially obviate one or more problems due to limitations and disadvantages of the related art.

An object of the present invention is to provide an Internet Protocol (IP) address allocation method using a base station in which an IP address is acquired using the base station so that an IP address allocation time can be shortened, and a mobile terminal and system for the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal comprises: a radio frequency (RF) unit for transmitting a signal requesting allocation of an Internet Protocol (IP) address for access to Internet to a base station and receiving information about an identifier of the base station and information about an IP address range allocated to the base station from the base station; and a controller for controlling the RF unit to transmit the IP address allocation request signal to the base station, selecting an IP address using the identifier information and IP address range information received through the RF unit, and controlling the RF unit to transmit a signal requesting use of the selected IP address to an IP address server through the base station.

In another aspect of the present invention, an IP address allocation method using a base station comprises the steps of: transmitting, by a mobile terminal, a signal requesting allocation of an IP address for access to Internet to the base station; receiving information about an identifier of the base station and information about an IP address range allocated to the base station from the base station; selecting an IP address using the received identifier information and IP address range information; and transmitting a signal requesting use of the selected IP address to an IP address server through the base station.

In another aspect of the present invention, a mobile terminal comprises: a memory for storing an identifiers-by-base stations-to-IP address ranges-by-base stations table; a RF unit for transmitting and receiving signals to/from an IP address server through a base station to which the mobile terminal is currently connected; and a controller for selecting an IP address for access to Internet using information about an identifier and IP address range corresponding to the currently connected base station, included in the table, in response to an Internet use request and controlling the RF unit to transmit a signal requesting use of the selected IP address to the IP address server through the base station.

In a further aspect of the present invention, a base station-based IP address allocation method comprises the steps of: searching, by the mobile terminal, an identifiers-by-base stations-to-IP address ranges-by-base stations table pre-stored therein for information about an identifier and IP address range corresponding to a base station to which the mobile terminal is currently connected; selecting an IP address for access to Internet using the searched identifier information and IP address range information; and transmitting a signal requesting use of the selected IP address to an IP address server through the base station.

In a further aspect of the present invention, an IP address allocation system comprises: a base station for searching for one or more unused IP addresses within an IP address range pre-allocated thereto in response to a signal requesting allocation of an IP address for access to Internet, and transmitting a signal including the searched IP addresses; a mobile terminal for transmitting the IP address allocation request signal to the base station, receiving the signal transmit from the base station, selecting a specific IP address from among the IP addresses in the received signal, and transmitting a signal requesting use of the selected IP address to the base station; and an IP address server for receiving the IP address use request signal from the mobile terminal through the base station and determining whether to permit the use of the selected IP address.

In a further aspect of the present invention, an IP address allocation method using a base station comprises the steps of: sending, by a mobile terminal, a signal requesting allocation of an IP address for access to Internet to the base station; receiving a signal including one or more unused IP addresses from the base station; selecting a specific IP address from among the IP addresses in the received signal; and sending a signal requesting use of the selected IP address to an IP address server through the base station.

In another aspect of the present invention, an IP address allocation method using a base station comprises the steps of: receiving, by the base station, a signal requesting allocation of an IP address for access to Internet from a mobile terminal; searching for one or more unused IP addresses within an IP address range pre-allocated thereto; and transmitting a signal including the searched IP addresses to the mobile terminal.

In yet another aspect of the present invention, a mobile terminal comprises: a RF unit for transmitting a signal requesting allocation of an IP address for access to Internet to a base station and receiving a signal including one or more unused IP addresses from the base station; and a controller for controlling the RF unit to transmit the IP address allocation request signal to the base station, selecting a specific IP address from among the IP addresses in the signal received through the RF unit, and controlling the RF unit to transmit a signal requesting use of the selected IP address to an IP address server through the base station.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Before the description of the present invention proceeds, a mobile terminal according to the present invention is assumed to be a mobile terminal for Global System for Mobile communication (GSM), Code Division Multiple Access (CDMA) or Wideband Code Division Multiple Access (WCDMA) supporting mobile Internet functions such as WiBro and WiMax.

It is also assumed that an Internet Protocol (IP) according to the present invention is a Dynamic Host Configuration Protocol (DHCP) IP and the version of the IP is Internet Protocol version 4 (IPv4).

Figure 1:
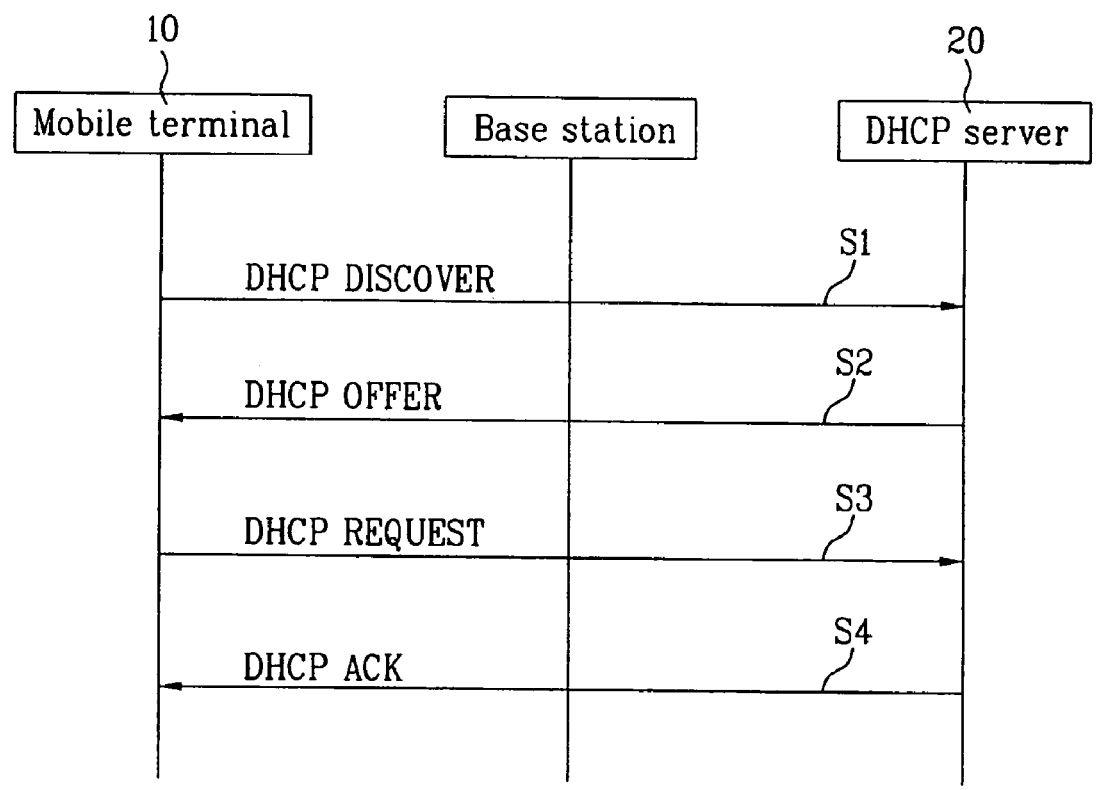
FIG. 1 is a flowchart illustrating a conventional IP address allocation process between a mobile terminal and a DHCP server.
Figure 2:
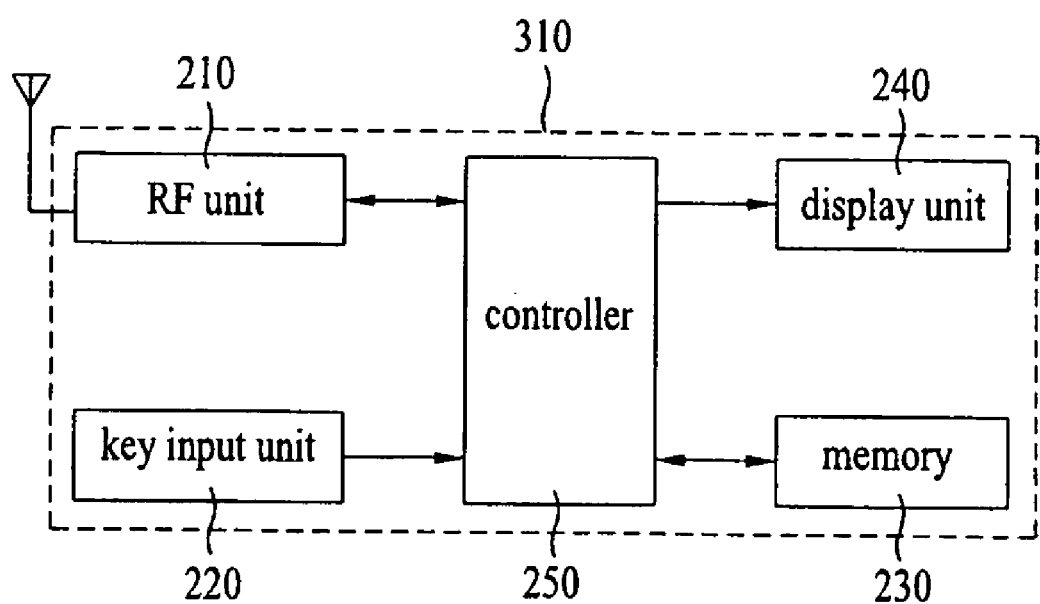
FIG. 2 is a block diagram showing an embodiment of a mobile terminal according to the present invention.
Figure 3:
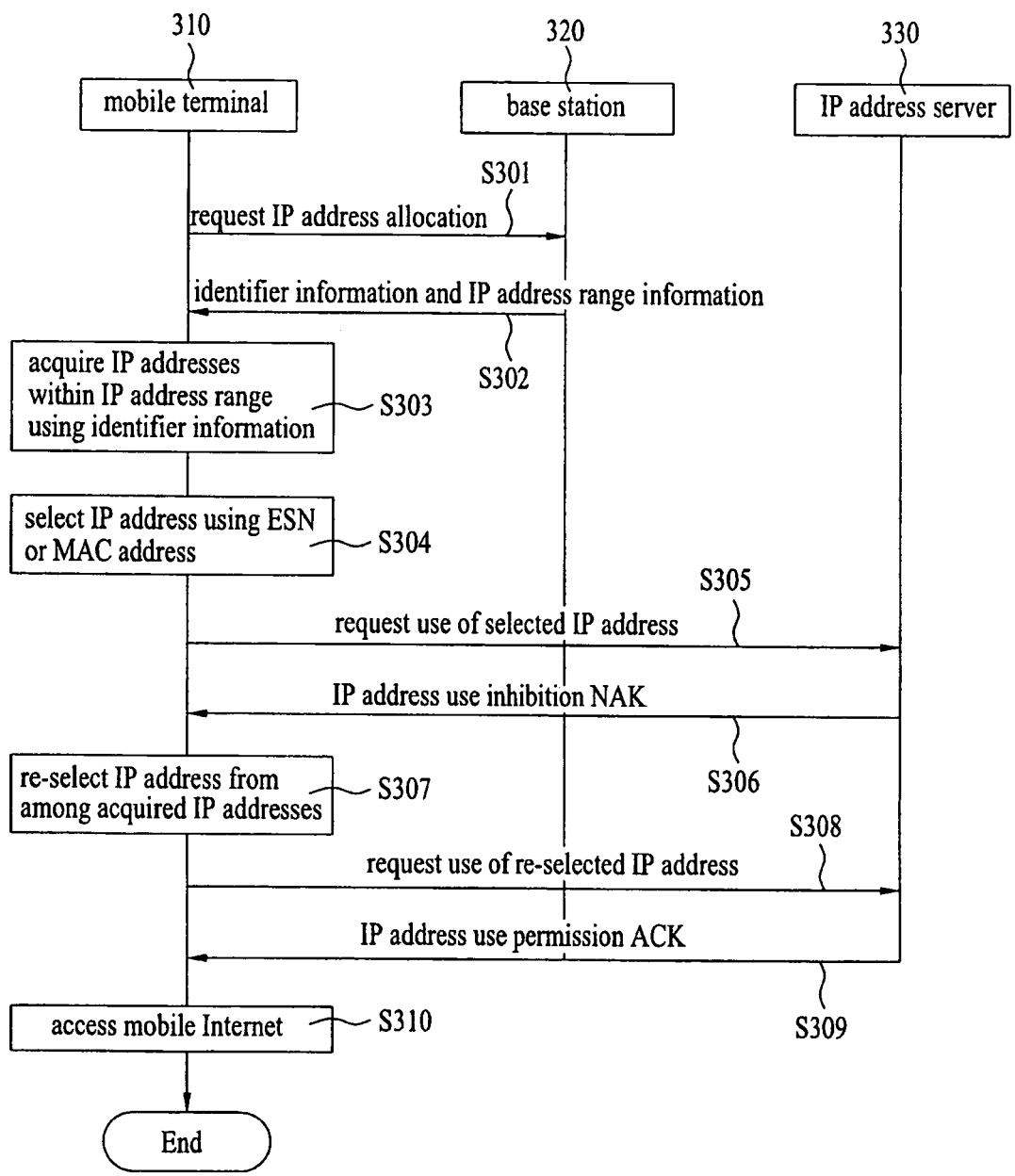
FIG. 3 is a flowchart illustrating an embodiment of an IP address allocation method according to the present invention, which is performed between the mobile terminal of FIG. 2 and a base station.
Figure 4:
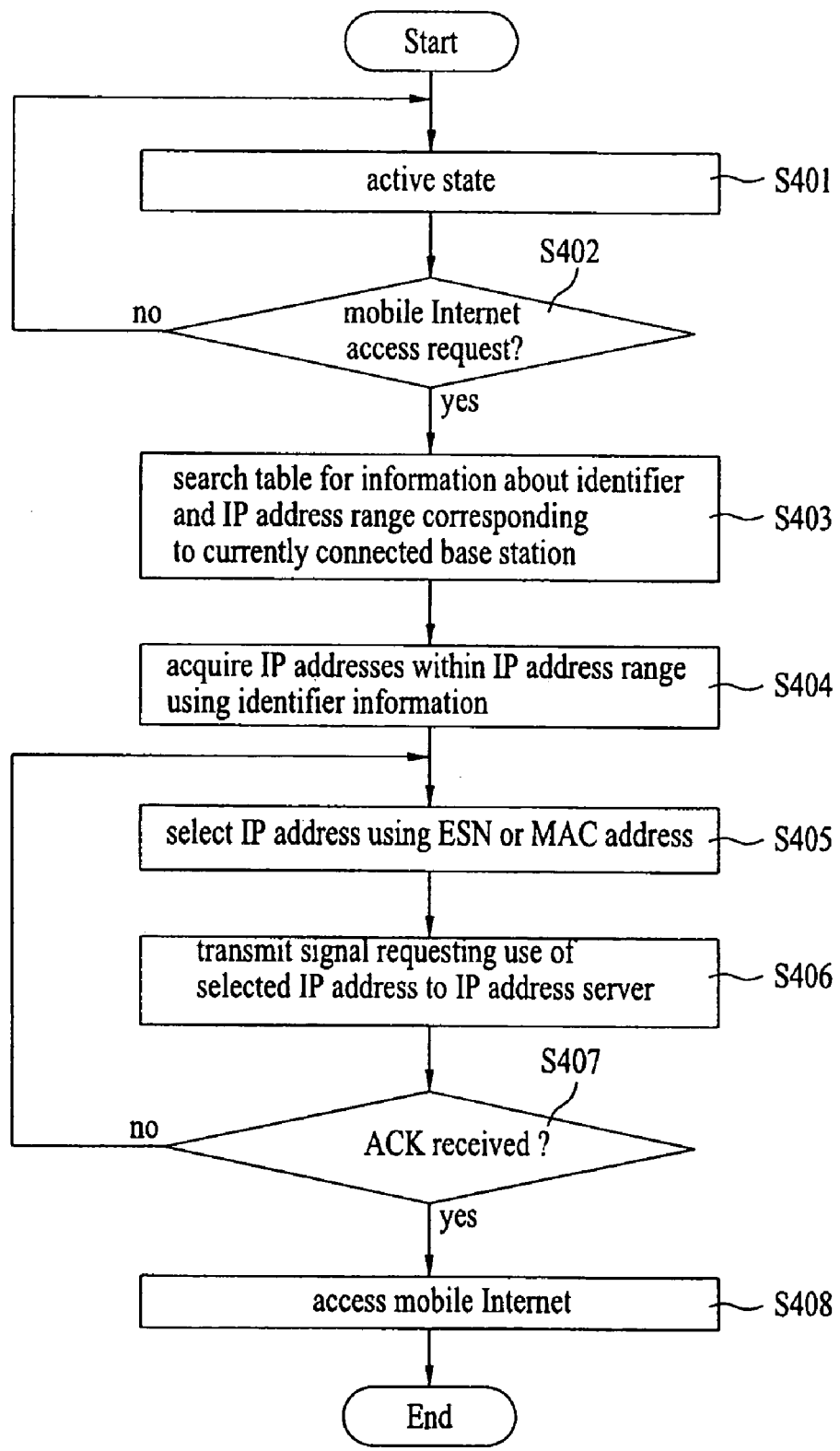
FIG. 4 is a flowchart illustrating another embodiment of the IP address allocation method according to the present invention, which is performed by the mobile terminal of FIG. 2 using the base station.

FIG. 2 is a block diagram showing an embodiment of a mobile terminal according to the present invention, FIG. 3 is a flowchart illustrating an embodiment of an IP address allocation method according to the present invention, which is performed between the mobile terminal of FIG. 2 and a base station, and FIG. 4 is a flowchart illustrating another embodiment of the IP address allocation method according to the present invention, which is performed by the mobile terminal of FIG. 2 using the base station.

Referring to FIG. 2 to FIG. 4, a radio frequency (RF) unit 210 of the mobile terminal according to the present invention, denoted by reference numeral 310, transmits and receives signals to/from an IP address server 330 through the base station 320, under control of a controller 250 of the mobile terminal 310.

That is, the RF unit 210 transmits a signal requesting allocation of an IP address for access to the Internet to the base station 320 under the control of the controller 250.

The RF unit 210 also receives, from the base station 320, information about an identifier of the base station 320 and information about an IP address range allocated to the base station 320, demodulates the received identifier information and IP address range information and outputs the demodulated information to the controller 250.

Preferably, IP address ranges are allocated respectively to base stations by the IP address server 330.

A key input unit 220 of the mobile terminal 310 is a user interface, which includes a plurality of numeral keys and a plurality of function keys and serves to output key signals corresponding to those keys to the controller 250.

A memory 230 of the mobile terminal 310 stores a specific program controlling the entire operation of the mobile terminal 310, and various data inputted and outputted when a control operation of the mobile terminal 310 is performed.

The memory 230 also acts to store the identifier information and IP address range information of the base station 320 received through the RF unit 210 in the form of a table under the control of the controller 250.

Alternatively, the memory 230 may store a base station identifier-to-IP address range table.

A display unit 240 of the mobile terminal 310 receives and displays display data corresponding to a key signal from the key input unit 220 under the control of the controller 250. The display unit 240 also acts to display the operation state of the mobile terminal 310 and a variety of information in the form of icons and characters under the control of the controller 250.

The controller 250 controls the entire operation of the mobile terminal 310.

A detailed description will hereinafter be given of operations associated with the IP address allocation using the base station according to one embodiment and another embodiment of the present invention.

First Embodiment

If a key signal for mobile Internet access request from the user is inputted through the key input unit 220, the controller 250 controls the RF unit 210 to transmit a signal requesting allocation of an IP address for the mobile Internet access to the base station 320 (S301).

The controller 250 receives information about an identifier of the base station 320 and information about an IP address range allocated to the base station 320 from the base station 320 through the RF unit 210 (S302).

The controller 250 stores the received identifier information and IP address range information in the memory 230 in the form of a table.

The controller 250 acquires one or more IP addresses for the mobile Internet access within the IP address range using the identifier information (S303).

The IP address acquisition operation of the above step S303 will hereinafter be described in detail with reference to Table 1 below.

The Table 1 is one example of a base station identifier to IP address range table according to the present embodiment.

TABLE 1

| BASE STATION IDENTIFIER | BASE STATION IP ADDRESS RANGE | ACQUIRED IP ADDRESS |
|---|---|---|
| 205 | X.X.X.01~X.X.X.20 | 1. X.X.X.01, X.X.X.20<br>2. X.X.X.05, X.X.X.11, X.X.X.17<br>3. X.X.X.05, X.X.X.10, X.X.X.15, X.X.X.20 |

Referring to the Table 1, the controller 250 can acquire IP addresses within the IP address range using the following various methods based on the identifier information according to the present embodiment.

1. The controller 250 can acquire a start IP address X.X.X.01 and an end IP address X.X.X.20 within an IP address range 'X.X.X.01~X.X.X.20' of a base station A.

2. The controller 250 can acquire an IP address within the IP address range 'X.X.X.01~X.X.X.20' using a specific digit of an identifier '205' of the base station A. For example, the controller 250 may acquire an IP address 'X.X.X.02' corresponding to the first digit '2' of the identifier '205' within the IP address range 'X.X.X.01~X.X.X.20'.

The controller 250 may also acquire an IP address 'X.X.X.05' corresponding to the last digit '5' of the identifier '205' within the IP address range 'X.X.X.01~X.X.X.20'.

Also, the controller 250 can acquire IP addresses within the IP address range 'X.X.X.01~X.X.X.20' by successively adding a certain numeral to the digit '5'. For example, the controller 250 may acquire IP addresses 'X.X.X.11' and 'X.X.X.17' by successively adding '6' to the digit '5'.

3. The controller 250 can acquire IP addresses within the IP address range 'X.X.X.01~X.X.X.20' by taking only multiples of the digit '5'. For example, the controller 250 may acquire IP addresses 'X.X.X.05', 'X.X.X.10', 'X.X.X.15' and 'X.X.X.20' which are multiples of the digit '5'.

The controller 250 can acquire one or more IP addresses for the mobile Internet access within the IP address range using the identifier information-based IP address acquisition methods described in the above Table 1.

Although one or more IP addresses have been disclosed to be acquired within the IP address range of the base station A using the three methods of the Table 1 based on the identifier information of the base station A, they may be acquired using various methods based on a modulo operation or hash function process, other than those three methods.

Table 2 is one example of a table where the acquired IP addresses are mapped.

TABLE 2

| BASE STATION IDENTIFIER | BASE STATION IP ADDRESS RANGE | ACQUIRED IP ADDRESS |
|---|---|---|
| 205 | X.X.X.01~X.X.X.20 | X.X.X.01, X.X.X.02, X.X.X.05, X.X.X.10, X.X.X.11, X.X.X.15, X.X.X.17, X.X.X.20 |

According to this embodiment, the controller 250 stores the acquired IP addresses of the above Table 1 in the memory 230 in the form of the Table 2, so that the mobile terminal can use those IP addresses without re-acquiring them when it is re-located in the service area of the base station 320.

The controller 250 selects a specific one of the acquired IP addresses using any one of an Electronic Serial Number (ESN) and Media Access Control (MAC) address of the mobile terminal 310 (S304).

The IP address selection operation of the above step S304 will hereinafter be described in detail with reference to the above Table 2.

Assuming that the ESN of the mobile terminal is '12.34.56.10', the controller 250 can first select a specific one of the acquired IP addresses of the above Table 2 using specific digits of the ESN '12.34.56.10'.

For example, using the last two digits '10' of the ESN '12.34.56.10', the controller 250 may first select the IP address 'X.X.X.10' corresponding to the digits '10' from among the IP addresses of the above Table 2.

Although only the ESN-based IP address selection operation of the controller 250 has been described, a detailed description of the MAC address-based IP address selection operation of the controller 250 will be omitted because it is similar to the ESN-based IP address selection operation.

In addition, because a specific IP address is selected from among the acquired IP addresses using the ESN or MAC address, it is possible to avoid IP address duplication among a plurality of mobile terminals located in the service area of the base station 320.

The controller 250 controls the RF unit 210 to transmit a signal requesting use of the selected IP address to the IP address server 330 through the base station 320 (S305).

The controller 250 re-selects an IP address other than the selected IP address from among the acquired IP addresses (S307) if an IP address use permission signal ACK associated with the IP address use request signal from the IP address server 330 is not received through the RF unit 210 (S306).

The controller 250 controls the RF unit 210 to re-transmit a signal requesting use of the re-selected IP address to the IP address server 330 through the base station 320 (S308).

Preferably, the controller 250 can re-select an IP address using specific digits of the ESN or MAC address of the mobile terminal.

The controller 250 receives the IP address use permission signal ACK associated with the IP address use request signal from the IP address server 330 through the RF unit 210.

The controller 250 provides a mobile Internet service to the user (S310) if the IP address use permission signal ACK associated with the IP address use request signal from the IP address server 330 is received through the RF unit 210 (S309).

Meanwhile, if the IP address use permission signal ACK from the IP address server 330 is not received with respect to all the acquired IP addresses, the controller 250 performs a conventional DHCP IP address allocation process.

Second Embodiment

If a key signal for mobile Internet access request from the user is inputted through the key input unit 220 (S402) under the condition that the mobile terminal 310 is in an active state (S401), the controller 250 searches an identifiers-by-base stations-to-IP address ranges-by-base stations table pre-stored in the memory 230 for information about an identifier and IP address range corresponding to a base station to which the mobile terminal 310 is currently connected (S403).

Table 3 is one example of the identifiers-by-base stations-to-IP address ranges-by-base stations table according to the present embodiment.

TABLE 3

| BASE STATION IDENTIFIERS | BASE STATION IP ADDRESS RANGES |
|---|---|
| BASE STATION A: 205 | X.X.X.01~X.X.X.20 |
| BASE STATION B: 206 | X.X.X.21~X.X.X.40 |
| BASE STATION C: 207 | X.X.X.41~X.X.X.60 |

Assuming that the base station to which the mobile terminal is currently connected is a base station A, the controller 250 searches the Table 3 for information about an identifier and IP address range corresponding to the base station A.

The controller 250 acquires one or more IP addresses for the mobile Internet access within the IP address range of the base station A using the IP address acquisition methods described in the above Table 1 based on the searched identifier information of the base station A (S404).

The controller 250 first selects a specific one of the acquired IP addresses using any one of an Electronic Serial Number (ESN) and Media Access Control (MAC) address of the mobile terminal (S405).

The IP address selection operation of the above step S405 is performed in the same manner as that of step S304 in the first embodiment, and a detailed description thereof will thus be omitted.

The controller 250 controls the RF unit 210 to transmit a signal requesting use of the selected IP address to the IP address server through the base station A (S406).

If an IP address use permission signal ACK associated with the IP address use request signal from the IP address server is received through the RF unit 210 (S407), the controller 250 gains access to the mobile Internet to provide a mobile Internet service to the user (S408).

On the other hand, if the IP address use permission signal ACK associated with the IP address use request signal from the IP address server is not received through the RF unit 210, the controller 250 re-selects an IP address other than the selected IP address from among the IP addresses acquired at step S404.

Preferably, the controller 250 can re-select an IP address using specific digits of the ESN or MAC address of the mobile terminal.

The controller 250 controls the RF unit 210 to re-transmit a signal requesting use of the re-selected IP address to the IP address server through the base station A.

Meanwhile, if the IP address use permission signal ACK from the IP address server is not received with respect to all the acquired IP addresses, the controller 250 performs a conventional DHCP IP address allocation process.

Third Embodiment

Figure 5:
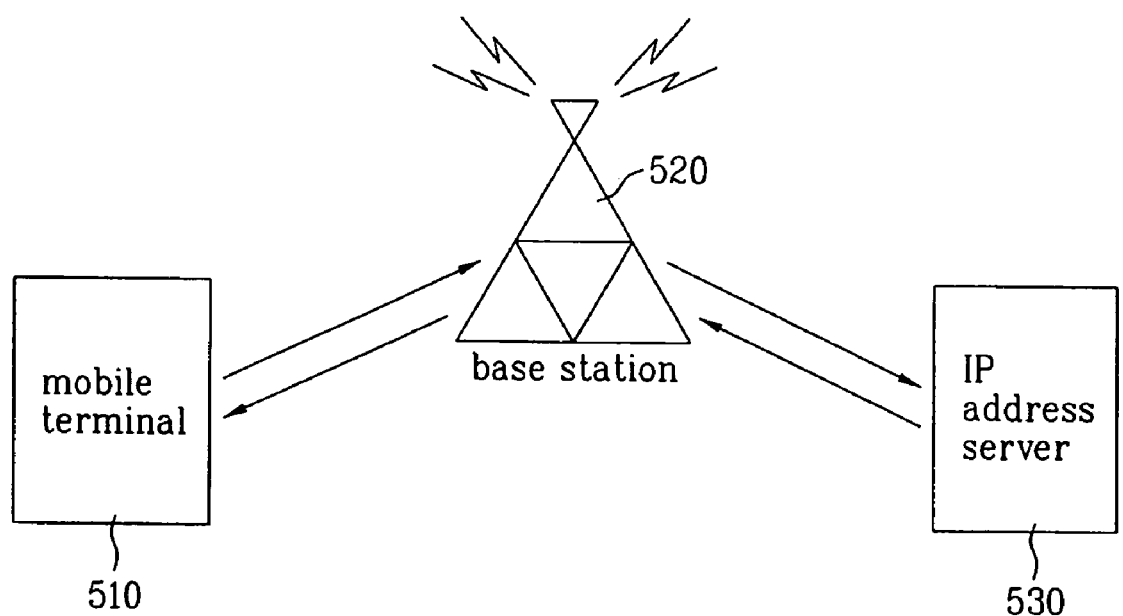
FIG. 5 is a schematic view of an IP address allocation system according to the present invention.

FIG. 5 is a schematic view of an IP address allocation system according to the present invention.

Referring to FIG. 5, the IP address allocation system according to the present invention comprises a mobile terminal 510 for transmitting a signal requesting allocation of an IP address for access to the mobile Internet to a base station 520 in response to a mobile Internet access request from the user, selecting a specific IP address from among IP addresses received from the base station 520 and transmitting a signal requesting use of the selected IP address to the base station 520. The base station 520 is adapted to search for one or more unused IP addresses within an IP address range pre-allocated thereto in response to the IP address allocation request signal and send a signal including the searched IP addresses to the mobile terminal 510. The IP address allocation system according to the present invention further comprises an IP address server 530 for receiving the IP address use request signal from the mobile terminal 510 through the base station 520 and determining whether to permit the use of the selected IP address.

An IP address allocation process according to the present invention will hereinafter be described in detail with reference to FIG. 6.

Figure 6:
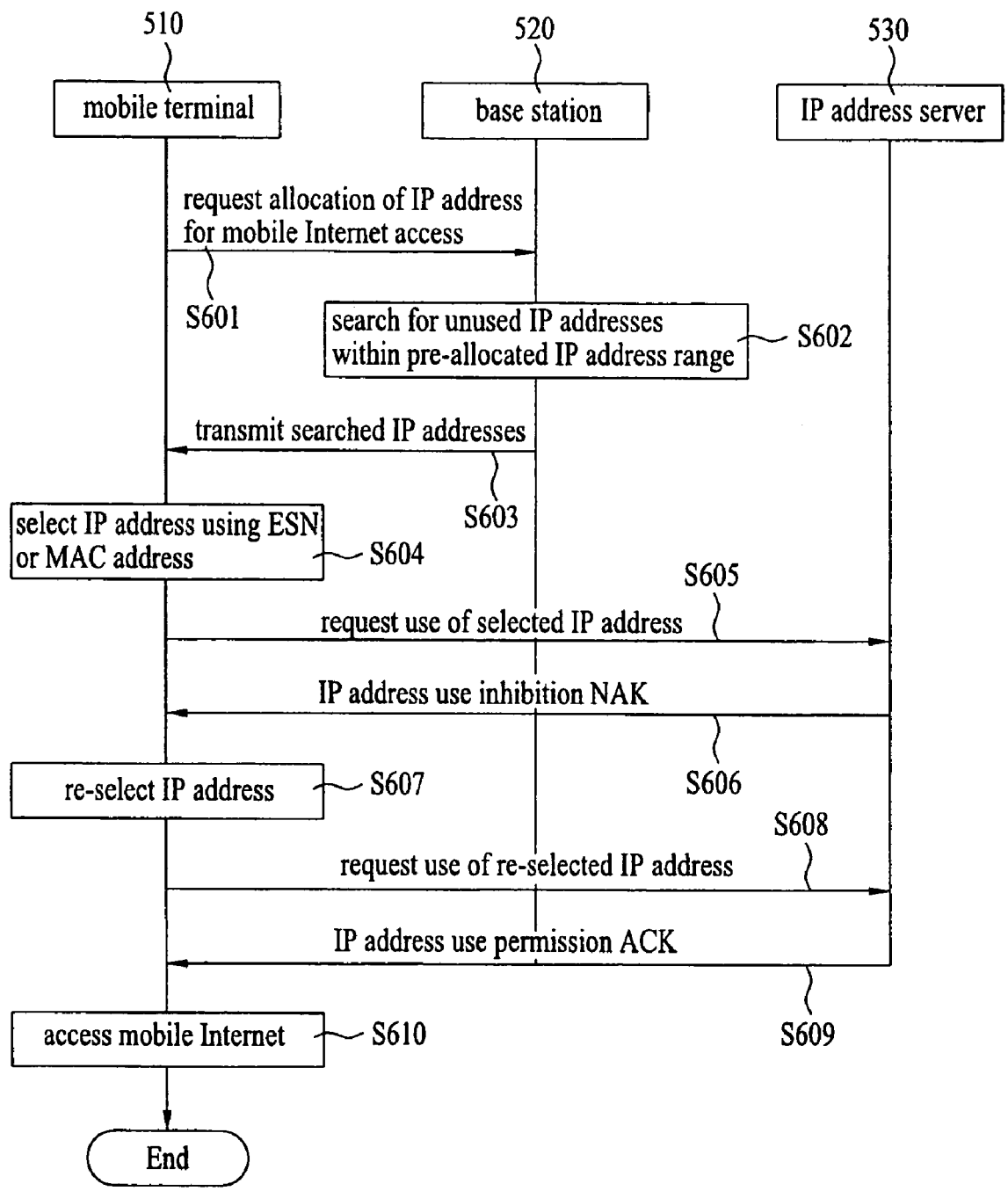
FIG. 6 is a flowchart illustrating an IP address allocation method of the system according to the present invention.

FIG. 6 is a flowchart illustrating an IP address allocation method according to the present invention.

Referring to FIG. 6, in response to a mobile Internet access request from the user, the mobile terminal 510 transmits a signal to the base station 520, requesting allocation of an IP address for the mobile Internet access (S601).

Upon receiving the IP address allocation request signal from the mobile terminal 510, the base station 520 searches for one or more unused IP addresses within an IP address range pre-allocated thereto by the IP address server 530 (S602).

The process of searching for allocable IP addresses within the IP address range of the base station 520 will hereinafter be described in detail with reference to Table 4 below.

The Table 4 shows IP address usage within the IP address range of the base station 520.

TABLE 4

| BASE STATION IDENTIFIER | BASE STATION IP ADDRESS | IP ADDRESS usage |
|---|---|---|
| BASE STATION A: 205 | 01. X.X.X.01 | IN USE ('101' MOBILE TERMINAL CONNECTION) |
| | 02. X.X.X.02 | IN USE ('115' MOBILE TERMINAL CONNECTION) |
| | 03. X.X.X.03 | IN USE ('118' MOBILE TERMINAL CONNECTION) |
| | 04. X.X.X.04 | IN USE ('121' MOBILE TERMINAL CONNECTION) |
| | 05. X.X.X.05 | IN USE ('124' MOBILE TERMINAL CONNECTION) |
| | 06. X.X.X.06 | UNUSED (ALLOCABLE) |

TABLE 4-continued

| BASE STATION IDENTIFIER | BASE STATION IP ADDRESS | IP ADDRESS usage |
|---|---|---|
| | 07. X.X.X.07 | UNUSED (ALLOCABLE) |
| | 08. X.X.X.08 | IN USE ('135' MOBILE TERMINAL CONNECTION) |
| | 09. X.X.X.09 | UNUSED (ALLOCABLE) |
| | 10. X.X.X.10 | UNUSED (ALLOCABLE) |
| | 11. X.X.X.11 | IN USE ('137' MOBILE TERMINAL CONNECTION) |
| | 12. X.X.X.12 | UNUSED (ALLOCABLE) |
| | 13. X.X.X.13 | UNUSED (ALLOCABLE) |
| | 14. X.X.X.14 | IN USE ('139' MOBILE TERMINAL CONNECTION) |
| | 15. X.X.X.15 | IN USE ('144' MOBILE TERMINAL CONNECTION) |
| | 16. X.X.X.16 | IN USE ('155' MOBILE TERMINAL CONNECTION) |
| | 17. X.X.X.17 | UNUSED (ALLOCABLE) |
| | 18. X.X.X.18 | IN USE ('168' MOBILE TERMINAL CONNECTION) |
| | 19. X.X.X.19 | UNUSED (ALLOCABLE) |
| | 20. X.X.X.20 | IN USE ('179' MOBILE TERMINAL CONNECTION) |

The base station 520 searches unused IP addresses in the IP address usage table, in case of Table 4 searching for IP addresses 'X.X.X.06', 'X.X.X.07', 'X.X.X.09', 'X.X.X.10', 'X.X.X.12', 'X.X.X.13', 'X.X.X.17' and 'X.X.X.19'.

The base station 520 transmits a signal including the searched IP addresses 'X.X.X.06', 'X.X.X.07', 'X.X.X.09', 'X.X.X.10', 'X.X.X.12', 'X.X.X.13', 'X.X.X.17' and 'X.X.X.19' to the mobile terminal 510 (S603).

The mobile terminal 510 receives the signal including the IP addresses 'X.X.X.06', 'X.X.X.07', 'X.X.X.09', 'X.X.X.10', 'X.X.X.12', 'X.X.X.13', 'X.X.X.17' and 'X.X.X.19' from the base station 520, and first selects a specific one of the IP addresses in the received signal using any one of an Electronic Serial Number (ESN) and Media Access Control (MAC) address of the mobile terminal 510 (S604).

The IP address selection operation of the above step S604 is performed in the same manner as that of step S304 in the first embodiment, and a detailed description thereof will thus be omitted.

The mobile terminal 510 transmits a signal requesting use of the selected IP address to the IP address server 530 through the base station 520 (S605).

The IP address server 530 receives the IP address use request signal from the mobile terminal 510 through the base station 520 and, if the selected IP address is not available, sends an IP address use inhibition signal NAK to the mobile terminal 510 (S606).

Upon receiving the IP address use inhibition signal NAK from the IP address server 530, the mobile terminal 510 re-selects a specific IP address other than the selected IP address, for example, 'X.X.X.12', from among the IP addresses 'X.X.X.06', 'X.X.X.07', 'X.X.X.09', 'X.X.X.10', 'X.X.X.13', 'X.X.X.17' and 'X.X.X.19' (S607).

Preferably, the mobile terminal 510 can re-select an IP address using specific digits of the ESN or MAC address thereof.

The mobile terminal 510 re-transmits a signal requesting use of the re-selected IP address to the IP address server 530 through the base station 520 (S608).

On the other hand, if the IP address use inhibition signal NAK from the IP address server 530 is received with respect to all the IP addresses 'X.X.X.06', 'X.X.X.07', 'X.X.X.09', 'X.X.X.10', 'X.X.X.12', 'X.X.X.13', 'X.X.X.17' and 'X.X.X.19', the mobile terminal 510 performs a conventional DHCP IP address allocation process.

The IP address server 530 receives the IP address use request signal from the mobile terminal 510 and, if the re-selected IP address is available, transmits an IP address use permission signal ACK to the mobile terminal 510 (S609).

Upon receiving the IP address use permission signal ACK from the IP address server 530, the mobile terminal 510 gains access to the mobile Internet to provide a mobile Internet service to the user (S610).

Next, a detailed description will be given of the operation of another embodiment of the mobile terminal 510 according to the present invention with reference to FIG. 7.

Figure 7:
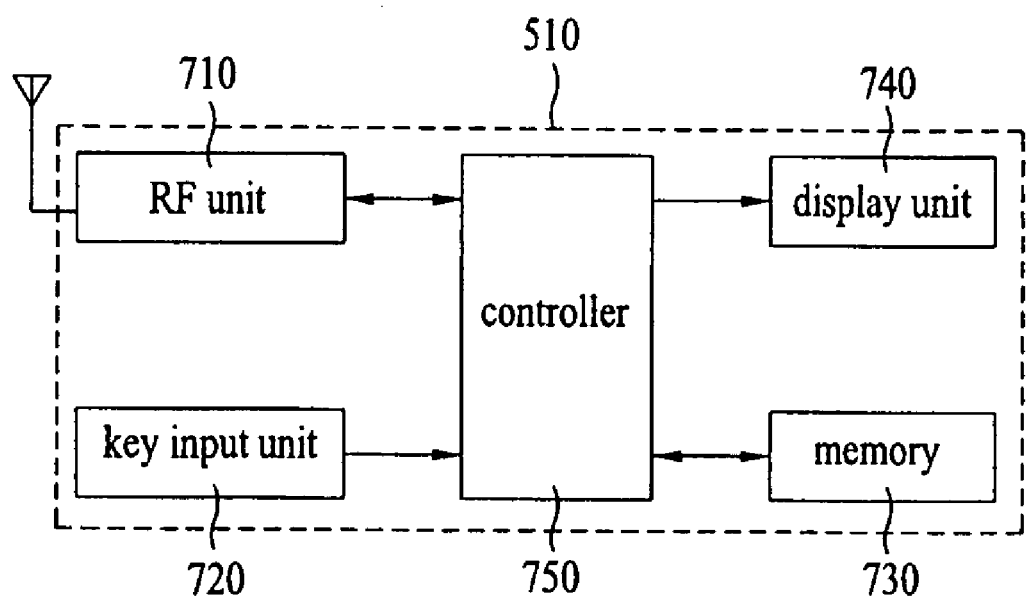
FIG. 7 is a block diagram of another embodiment of the mobile terminal according to the present invention.

FIG. 7 is a block diagram of the second embodiment of the mobile terminal according to the present invention.

Referring to FIG. 7, a RF unit 710 transmits and receives signals to/from the IP address server 530 through the base station 520 under control of a controller 750.

The RF unit 710 also transmits a signal requesting allocation of an IP address for access to the mobile Internet to the base station 520 under the control of the controller 750. The RF unit 710 further receives a signal including one or more IP addresses from the base station 520, demodulates the received signal and outputs the demodulated signal to the controller 750.

A key input unit 720 is a user interface, which includes a plurality of numeral keys and a plurality of function keys and serves to output key signals corresponding to those keys to the controller 750.

A memory 730 stores a specific program controlling the entire operation of the mobile terminal 510, and various data inputted and outputted when a control operation of the mobile terminal 510 is performed.

The memory 730 also acts to store the IP addresses received through the RF unit 710 under the control of the controller 750.

A display unit 740 receives and displays display data corresponding to a key signal from the key input unit 720 under the control of the controller 750. The display unit 740 also acts to display the operation state of the mobile terminal 510 and a variety of information in the form of icons and characters under the control of the controller 750.

The controller 750 transmits the IP address allocation request signal to the base station 520 through the RF unit 710 if a key signal for mobile Internet access request from the user is inputted through the key input unit 720.

If the signal including the IP addresses from the base station 520 is received through the RF unit 710, the controller 750 first selects a specific one of the IP addresses in the received signal using any one of an Electronic Serial Number (ESN) and Media Access Control (MAC) address of the mobile terminal 510.

The IP address selection operation of the controller 750 is performed in the same manner as that of step S304 in the first embodiment, and a detailed description thereof will thus be omitted.

The controller 750 controls the RF unit 710 to transmit a signal requesting use of the selected IP address to the IP address server 530 through the base station 520.

If an IP address use permission signal ACK associated with the IP address use request signal from the IP address server 530 is not received through the RF unit 710, the controller 750 re-selects a specific IP address other than the selected IP address from among the IP addresses in the received signal.

Preferably, the controller 750 can re-select an IP address using specific digits of the ESN or MAC address of the mobile terminal 510.

The controller 750 controls the RF unit 710 to re-transmit a signal requesting use of the re-selected IP address to the IP address server 530 through the base station 520.

If the IP address use permission signal ACK from the IP address server 530 is not received with respect to all the IP addresses in the received signal through the RF unit 710, the controller 750 performs a conventional DHCP IP address allocation process.

On the other hand, if the IP address use permission signal ACK from the IP address server 530 is received through the RF unit 710, the controller 750 gains access to the mobile Internet to provide a mobile Internet service to the user.

As apparent from the above description, the present invention provides an Internet Protocol (IP) address allocation method using a base station in which an IP address is acquired using the base station so that an IP address allocation time can be shortened, and a mobile terminal and system for the same. Therefore, it is possible to rapidly provide a mobile Internet service to the user and to reduce transmission and reception of unnecessary messages on a network, resulting in an improvement in network efficiency.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An Internet protocol (IP) address allocation method using a base station, comprising:
    transmitting, by a mobile terminal, a signal requesting allocation of an IP address for access to Internet via the base station;
    receiving, from the base station, information about an identifier of the base station and an IP address range allocated to the base station;
    searching, by the mobile terminal, a plurality of IP addresses including a specific digit of the base station identifier within the received IP address range;
    selecting, by the mobile terminal, a first IP address using at least two digits of an Electronic Serial Number (ESN) of the mobile terminal within the searched IP addresses;
    transmitting, by the mobile terminal, a signal requesting use of the selected first IP address to an IP address server through the base station;
    re-selecting, by the mobile terminal, a second IP address within the searched IP addresses when an IP address use permission signal associated with the first IP address use request signal from the IP address server is not received through the base station; and
    re-transmitting, by the mobile terminal, a signal requesting use of the re-selected second IP address to the IP address server through the base station,
    wherein the searching step includes at least one of:
        searching the plurality of IP addresses by successively adding a certain numeral to the specific digit of the base station identifier,
        searching the plurality of IP addresses by taking only specific multiples to the specific digit of the base station identifier, and
        searching the plurality of IP addresses by a modulo arithmetic or hash function process to the specific digit of the base station identifier.

2. The IP address allocation method according to claim 1, wherein the IP is a Dynamic Host Configuration Protocol (DHCP) IP.

3. A mobile terminal, comprising:
    a Radio Frequency (RF) unit configured to transmit a signal requesting allocation of an IP address for access to Internet to a base station and receiving an identifier of the base station and information about an IP address range allocated to the base station from the base station; and
    a controller configured to control the RF unit to
        transmit the IP address allocation request signal to the base station,
        search a plurality of IP addresses including a specific digit of the base station identifier within the IP address range received through the RF unit,
        select a first IP address using at least two digits of an Electronic Serial Number (ESN) of the mobile terminal within the searched IP addresses,
        send a signal requesting use of the selected first IP address to an IP address server through the RF unit,
        re-select a second IP address within the searched IP addresses when an IP address use permission signal associated with the first IP address use request signal from the IP address server is not received through the RF unit, and re-send a signal requesting use of the re-selected second IP address to the IP address server through the RF unit,
    wherein the controller is further configured to perform at least one of the following:
        search the plurality of IP addresses by successively adding a certain numeral to the specific digit of the base station identifier,
        search the plurality of IP addresses by taking only specific multiples to the specific digit of the base station identifier, and
        search the plurality of IP addresses by a modulo arithmetic or hash function process to the specific digit of the base station identifier.

4. The mobile terminal according to claim 3, wherein the IP is a Dynamic Host Configuration Protocol (DHCP) IP.

5. A mobile terminal, comprising:
    a memory configured to store a base station identifier to IP address range table;
    a radio frequency (RF) unit configured to transmit and receive signals to/from an IP address server through a base station to which the mobile terminal is currently connected; and
    a controller configured to
        search a plurality of IP addresses including a specific digit of the base station identifier within the IP address range corresponding to the currently connected base station, included in the table, in response to an Internet use request,
        select a first IP address using at least two digits of an Electronic Serial Number (ESN) of the mobile terminal within the searched IP addresses, to send a signal requesting use of the selected first IP address to an IP address server through the RF unit,
        re-select a second IP address within the searched IP addresses when an IP address use permission signal associated with the first IP address use request signal from the IP address server is not received through the RF unit, and re-send a signal requesting use of the re-selected second IP address to the IP address server through the RF unit,
    wherein the controller is further configured to perform at least one of the following:
        search the plurality of IP addresses by successively adding a certain numeral to the specific digit of the base station identifier, search the plurality of IP addresses by taking only specific multiples to the specific digit of the base station identifier, and search the plurality of IP addresses by a modulo arithmetic or hash function process to the specific digit of the base station identifier.

6. The mobile terminal according to claim 5, wherein the IP is a DHCP IP.

* * * * *